United States Patent
Saito (10) Patent No.: US 8,488,151 B2
(45) Date of Patent: Jul. 16, 2013

(54) IMAGE INPUT-OUTPUT APPARATUS AND METHOD, AND JOB EVENT-RECORDING SYSTEM

(75) Inventor: Shigemi Saito, Kawasaki (JP)

(73) Assignee: Canon Kabushiki Kaisha (JP)

( * ) Notice: Subject to any disclaimer, the term of this patent is extended or adjusted under 35 U.S.C. 154(b) by 697 days.

(21) Appl. No.: 12/404,456

(22) Filed: Mar. 16, 2009

(65) Prior Publication Data

US 2009/0231624 A1    Sep. 17, 2009

(30) Foreign Application Priority Data

Mar. 17, 2008   (JP) .................................. 2008-067878

(51) Int. Cl.
*G06F 15/00*   (2006.01)
*G06F 3/12*    (2006.01)
*G06K 1/00*    (2006.01)

(52) U.S. Cl.
USPC .......................... 358/1.15; 358/1.9; 358/1.13

(58) Field of Classification Search
None
See application file for complete search history.

(56) References Cited

U.S. PATENT DOCUMENTS

| | | | |
|---|---|---|---|
| 2002/0030851 A1* | 3/2002 | Wanda | 358/1.15 |
| 2003/0204547 A1* | 10/2003 | Davis et al. | 709/101 |
| 2004/0253981 A1* | 12/2004 | Blume et al. | 455/552.1 |
| 2006/0221392 A1 | 10/2006 | Wanda | |
| 2006/0268332 A1* | 11/2006 | Shimada | 358/1.15 |
| 2007/0030518 A1* | 2/2007 | Okamoto et al. | 358/1.15 |
| 2007/0156786 A1 | 7/2007 | May et al. | |
| 2007/0285712 A1* | 12/2007 | Komada | 358/1.15 |
| 2008/0137129 A1* | 6/2008 | Ferlitsch | 358/1.15 |
| 2009/0316170 A1* | 12/2009 | Tsujii | 358/1.9 |

FOREIGN PATENT DOCUMENTS

| | | |
|---|---|---|
| CN | 1893526 A | 1/2007 |
| CN | 1913569 A | 2/2007 |
| EP | 1 635 565 A2 | 3/2006 |
| EP | 1 727 349 A2 | 11/2006 |
| JP | 09-174956 A | 7/1997 |
| JP | 11-341212 A | 12/1999 |
| JP | 2001-320517 A | 11/2001 |
| JP | 2006-330939 A | 12/2006 |
| JP | 2008-011265 A | 1/2008 |
| KR | 10-0796115 B1 | 1/2008 |
| WO | 2006/030878 A1 | 3/2006 |

OTHER PUBLICATIONS

Extended European Search Report issued in corresponding European Patent Application No. 09155212.5 dated Sep. 10, 2009.
Office Action issued in corresponding Korean Patent Application No. 10-2009-0022673 dated Nov. 18, 2010.

(Continued)

*Primary Examiner* — Ming Hon
(74) *Attorney, Agent, or Firm* — Rossi, Kimms & McDowell LLP (57) ABSTRACT

An image input-output apparatus capable of recording information enabling events of image data items output by output jobs to be tracked, while suppressing load on a network and a server. If an executed job is an output job, a job event of the output job is recorded in association with a job event of an input job in which image data used in the output job is input. If the job event is of an output job, the job event of the input job associated with the job event of the output job is transmitted to a server together with the job event of the output job, whereas if the job event is of an input job, and image data input by the input job is not used in any other job, the job event of the input job is not transmitted to the server.

8 Claims, 10 Drawing Sheets

OTHER PUBLICATIONS

Chinese Office Action issued in Chinese patent application No. CN200910119002.1, dated Mar. 12, 2012. English translation provided.

Japanese Office Action issued in counterpart application No. JP2008-067878 dated Apr. 17, 2012.

* cited by examiner

| JOB TYPE | JOB CLASSIFICATION | USED AS IMAGE DATA IN OUTPUT JOB | TYPE OF IMAGE DATA |
|---|---|---|---|
| COPY JOB | INPUT JOB | NOT USED | IMAGE DATA |
| PDL-PRINT JOB | INPUT JOB | NOT USED | IMAGE DATA |
| SCAN JOB/BOX STORING JOB | INPUT JOB | USED | IMAGE DATA |
| RECEIVING JOB (FAX/I-FAX) | INPUT JOB | USED | IMAGE DATA |
| TRANSMISSION JOB (FAX/I-FAX/SEND) | OUTPUT JOB | NOT USED | REFERENCE INFORMATION |
| BOX-PRINT JOB, RECEPTION PRINT JOB | OUTPUT JOB | NOT USED | REFERENCE INFORMATION |

FIG.5

```xml
<?xml version=" 1.0" encoding=" UTF-16" ?>
<!-- Sample-->
<logInformation xmlns:xlink=" http://www.w3.org/1999/xlink" >
    <deviceInformation>
        <deviceName>My Device</deviceName>
        <productName>Canon iR6800</productName>
        <serialNumber>abc00001</serialNumber>
        <location>35F</location>
    </deviceInformation>
    <userInformation>
        <departmentID>12345</departmentID>
        <userName>shimizu</userName>
        <domainName>domain1</domainName>
    </userInformation>
    <jobInformation>
        <documentID>00000003</documentID>
        <documentFlag>no</documentFlag>
        <jobType>fax-send</jobType>
        <jobName>My Document</jobName>
        <pageNum>2</pageNum>
        <copies>1</copies>
        <startDateTime>2004/06/11 13:44:58</startDateTime>
        <endDateTime>2004/06/11 13:45:14</endDateTime>
        <result>ok</result>
    </jobInformation>
</logInformation>
```

| | JOB CLASSIFICATION | JOBS TO BE RECORDED | JOB EVENTS |
|---|---|---|---|
| CONVENTIONAL METHOD | INPUT JOB | ALL JOBS | IMAGE DATA INCLUDED (LARGE IN DATA AMOUNT) |
| | OUTPUT JOB | ALL JOBS | REFERENCE INFORMATION INCLUDED, BUT NOT DATA NOT INCLUDED (SMALL IN DATA AMOUNT) |
| METHOD EMPLOYED IN PRESENT INVENTION | INPUT JOB | TARGET JOBS, OR INPUT JOBS OF IMAGE DATA OUTPUT IN TARGET JOBS | IMAGE DATA INCLUDED (LARGE IN DATA AMOUNT) |
| | OUTPUT JOB | TARGET JOBS | REFERENCE INFORMATION INCLUDED, BUT IMAGE DATA NOT INCLUDED (SMALL IN DATA AMOUNT) |

FIG.10

| JOB TYPE | JOB CLASSIFICATION | STORAGE AREA |
|---|---|---|
| COPY JOB | INPUT JOB | NO AREA |
| PDL-PRINT JOB | INPUT JOB | NO AREA |
| SCAN JOB/BOX STORING JOB | INPUT JOB | USER BOX |
| RECEIVING JOB | INPUT JOB | FAX BOX |
| TRANSMISSION JOB | OUTPUT JOB | NO AREA |
| BOX-PRINT JOB | OUTPUT JOB | USER BOX |
| RECEPTION PRINT JOB | OUTPUT JOB | FAX BOX |

IMAGE INPUT-OUTPUT APPARATUS AND METHOD, AND JOB EVENT-RECORDING SYSTEM

BACKGROUND OF THE INVENTION

1. Field of the Invention

The present invention relates to an image input-output apparatus which is capable of recording, as to executed jobs, job events each including information on a user who executed a job and date and time of execution of the job, an image input-output method, and a job event-recording system.

2. Description of the Related Art

Recently, with widespread use of printers and digital multifunction apparatuses as image input-output apparatuses, it has become easier for anyone to perform printing, copying, and transmission of originals. Such newly-emerged input-output apparatuses are improved in userfriendliness of the apparatuses, but on the other hand, a new problem has occurred that printing, copying, or transmission of confidential documents can cause information leakage.

To prevent this information leakage, there has been proposed a digital multifunction apparatus in which job events are cumulatively recorded in a storage (recording) device whenever a job, such as printing, copying, facsimile transmission, or e-mail transmission, is executed.

A job event includes information on a user who executed the job, information on the job execution date and time, information for specifying the digital multifunction apparatus which executed the job (e.g. IP address, or a serial number of the apparatus), information on an executed job type, etc. Further, the job event may include image data generated by converting an input image into data, or reduced image data generated by reducing the image data.

A job event-recording system is comprised of a plurality of the above-described digital multifunction apparatuses and a server. A database is constructed on the server. Job events recorded in the digital multifunction apparatuses are transferred to the database and are recorded therein.

Since it is necessary for such a digital multifunction apparatus or a job event-recording system to be configured to have a large recording area, there has been proposed a technique which suppresses an increase in the required recording capacity (see Japanese Laid-Open Patent Publication No. 2006-330939).

Further, to prevent information leakage, there is a demand to record only designated types of jobs, such as facsimile transmission to the outside, or e-mail transmission of image data which is scanned by the digital multifunction apparatus.

Let it be assumed that an auditor designates a job type to be recorded in advance to the job event-recording system meeting this demand. Only in case where the designated job type is executed, the digital multifunction apparatus records a job event and transmits the same to the server.

Some of the digital multifunction apparatuses, for example, have an area which is internally provided for storing image data and has a name, such as a user box, given thereto, and have functions of reusing and transmitting the image data stored in the user box by facsimile or e-mail.

In a case where job events of facsimile transmission or e-mail transmission are recorded in the digital multifunction apparatus having the above-mentioned functions, there is a demand to record not only job events at respective output times, but also job events at respective times when image data items are stored in the user box, for tracking events of image data items.

However, to track events of image data items, it becomes necessary to store, in the server, job events of all jobs in which image data items are reusably stored in the digital multifunction apparatus, e.g. in the above-mentioned user box thereof, in addition to jobs of the designated job types. For this reason, a problem that the storage capacity required for the server to construct the database increases, which brings about the problem of an increase in the costs of the server.

Further, load put on a network at the time of transfer from the digital multifunction apparatus to the server, or load on the server in which the database is provided increases.

Further, the information leakage auditor conducts an audit by searching the recorded image data items or information on the job events. However, if the not only job events of jobs of the designated job types, but also those of all input jobs which introduced reusable image data are recorded, the job event-recording system is required to perform the following processes, which makes the searching process complicated.

That is, it becomes necessary to execute, for example, processes for executing a full-text search by a keyword on the job events recorded in the database, determining on each of image data items hit by the search whether or not it is among the designated job types, adding information on the hit image data item to a result list if it is among the designated job types, whereas if it is not among the designated job types but it is an input job, determining on the hit image data item whether or not any designated job type is executed thereon, and if any designated job type is executed thereon, adding information on the hit image data item to the result list.

As described above, in a case where job events of jobs other than those of designated job types are stored in the database, due to the large number of image data items to be searched, and complexity of the search process, there arises a problem that it takes a long time to perform the search.

SUMMARY OF THE INVENTION

The present invention provides an image input-output apparatus and a job event-recording system which are capable of recording information which enables events of image data items output by output jobs to be tracked, and at the same time suppressing load on a network and a server. Further, the present invention provides an image input-output apparatus and a job event-recording system which make it possible to reduce time required in searching for desired job events from a database having job events recorded therein.

In a first aspect of the present invention, there is provided an image input-output apparatus comprising a job execution unit adapted to be capable of executing input jobs concerning input of an image, and output jobs concerning output of an image, a job event-recording unit adapted to record job events which are respective pieces of information concerning jobs executed by the job execution unit, and a job event transmission unit adapted to transmit the job events to a server, wherein if a job executed by the job execution unit is an output job, the job event-recording unit records a job event of the output job in association with a job event of an input job in which image data used in the output job is input, and wherein if the job event is a job event of an output job, the job event transmission unit transmits the job event of the input job associated with the job event of the output job to the server together with the job event of the output job, whereas if the job event is a job event of an input job, and image data input by the input job is not used in any other job, the job event transmission unit does not transmit the job event of the input job to the server.

In a second aspect of the present invention, there is provided a job event-recording system comprising an image input-output apparatus comprising a job execution unit adapted to be capable of executing input jobs concerning input of an image, and output jobs concerning output of an image, a job event-recording unit adapted to record job events which are respective pieces of information concerning jobs executed by the job execution unit, and a job event transmission unit adapted to transmit the job events, wherein if a job executed by the job execution unit is an output job, the job event-recording unit records a job event of the output job in association with a job event of an input job in which image data used in the output job is input, and wherein if the job event is a job event of an output job, the job event transmission unit transmits the job event of the input job associated with the job event of the output job together with the job event of the output job, whereas if the job event is a job event of an input job, and image data input by the input job is not used in any other job, the job event transmission unit does not transmit the job event of the input job, and a server comprising a job event-recording unit adapted to receive and record job events transmitted by the image input-output apparatus, wherein the job event-recording unit records the job event of an output job and the job event of an input job in association with each other.

In a third aspect of the present invention, there is provided an image input-output method comprising executing input jobs concerning input of an image, and output jobs concerning output of an image, recording job events which are respective pieces of information concerning executed jobs, and transmitting the job events to a server, wherein if the executed job is an output job, the recording includes recording a job event of the output job in association with a job event of an input job in which image data used in the output job is input, and wherein if the job event is a job event of an output job, the transmitting includes transmitting the job event of the input job associated with the job event of the output job to the server together with the job event of the output job, whereas if the job event is a job event of an input job, and image data input by the input job is not used in any other job, the transmitting includes not transmitting the job event of the input job to the server.

According to the present invention, it is possible to record information which makes it possible to track events of image data items output by output jobs, and at the same time suppress load on the network and the server. Further, it becomes possible to reduce time required in searching for desired job events from a database having job events recorded therein.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

Figure 1:
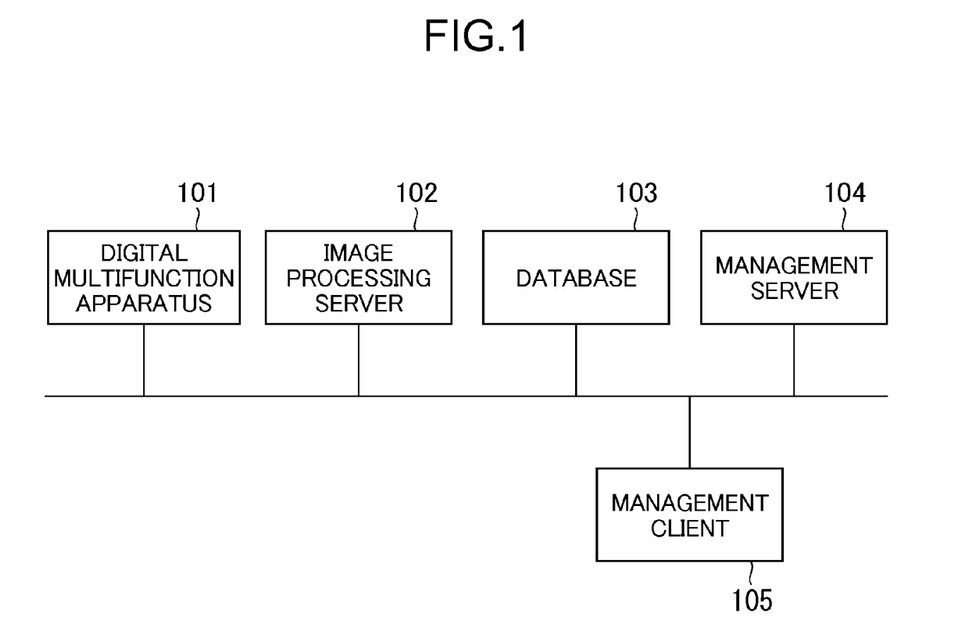
FIG. 1 is a whole block diagram of a job event-recording system including a digital multifunction apparatus as an image input-output apparatus according to an embodiment of the present invention.

FIG. 1 is a whole block diagram of a job event-recording system including a digital multifunction apparatus as an image input-output apparatus according to an embodiment of the present invention.

As shown in FIG. 1, a job event-recording system is constructed by interconnecting a digital multifunction apparatus 101 as an image input-output apparatus, an image processing server 102, a database 103, a management server 104, and a management client 105 on a network.

The digital multifunction apparatus 101 is equipped with a scan function, a print function, a copy function, an e-mail function, a facsimile function, and so forth. The digital multifunction apparatus 101 has an area called a user box which is internally provided for storing image data, and has the function of transmitting image data stored in the user box by facsimile or e-mail.

The digital multifunction apparatus 101 has the function of executing a job, and at the same time recording a job event of the job. The job event is comprised of electronic image data of the job, and job attributes including information concerning execution of the job, such as a job executor, an execution date and time, and a digital multifunction apparatus having executed the job.

The digital multifunction apparatus 101 has the function of setting and storing jobs to be recorded as job events. The digital multifunction apparatus 101 can also be configured to operate to record only jobs to be recorded as job events, or only input jobs in which reusable image data is input (refer to FIG. 3 for definition).

The digital multifunction apparatus 101 transfers the recorded job events to the image processing server 102 at a preset time. An operation for the transfer will be described hereinafter with reference to FIG. 7.

The image processing sever 102 performs OCR processing on image data included in the job event transferred from the digital multifunction apparatus 101, to thereby extract text information (text data). Thereafter, the text data is converted into a format suitable for storage in the database 103 and is registered in the same. Further, the received job attributes are registered in association with the image data. The OCR processing and the conversion of the text data by the image processing sever 102 into a format suitable for storage in the database are hereinafter referred to as data conversion processing.

Image data and associated text data and job attributes sent from the image processing server 102 are cumulatively stored in the database 103.

The management server 104 records and manages information on settings, such as types of jobs of which the job events are to be recorded by the digital multifunction apparatus 101, transfer schedules for transferring job events to the image processing server 102, and an image converting method employed by the image processing server 102. When the settings are changed, the management server 104 notifies the digital multifunction apparatus 101, and the image processing server 102 of the changed i.e. new settings. This notification may be performed when the management server 104 receives an inquiry as to the settings from the digital multifunction apparatus 101 or the image processing server 102.

The management client 105 is a terminal apparatus used by an administrator of the present job event-recording system so as to configure settings of the management server 104, or view or search job events stored in the database 103. The management client 105 is implemented by a general PC.

Although in FIG. 1, the system includes the digital multifunction apparatus 101 to the management client 105 as component elements thereof, one unit for each kind of component element, the system may include a plurality of units per kind of component element. In particular, a plurality of digital multifunction apparatuses 101 are often included in a single system. The image processing server 102 may be redundantly configured mainly for load dispersion, and the database 103 and the management server 104 may be redundantly configured so as to enhance reliability.

Further, a component element and another component element may be provided within the same server. For example, the management server 104 and the image processing server 102 may be included in one identical server.

Figure 2:
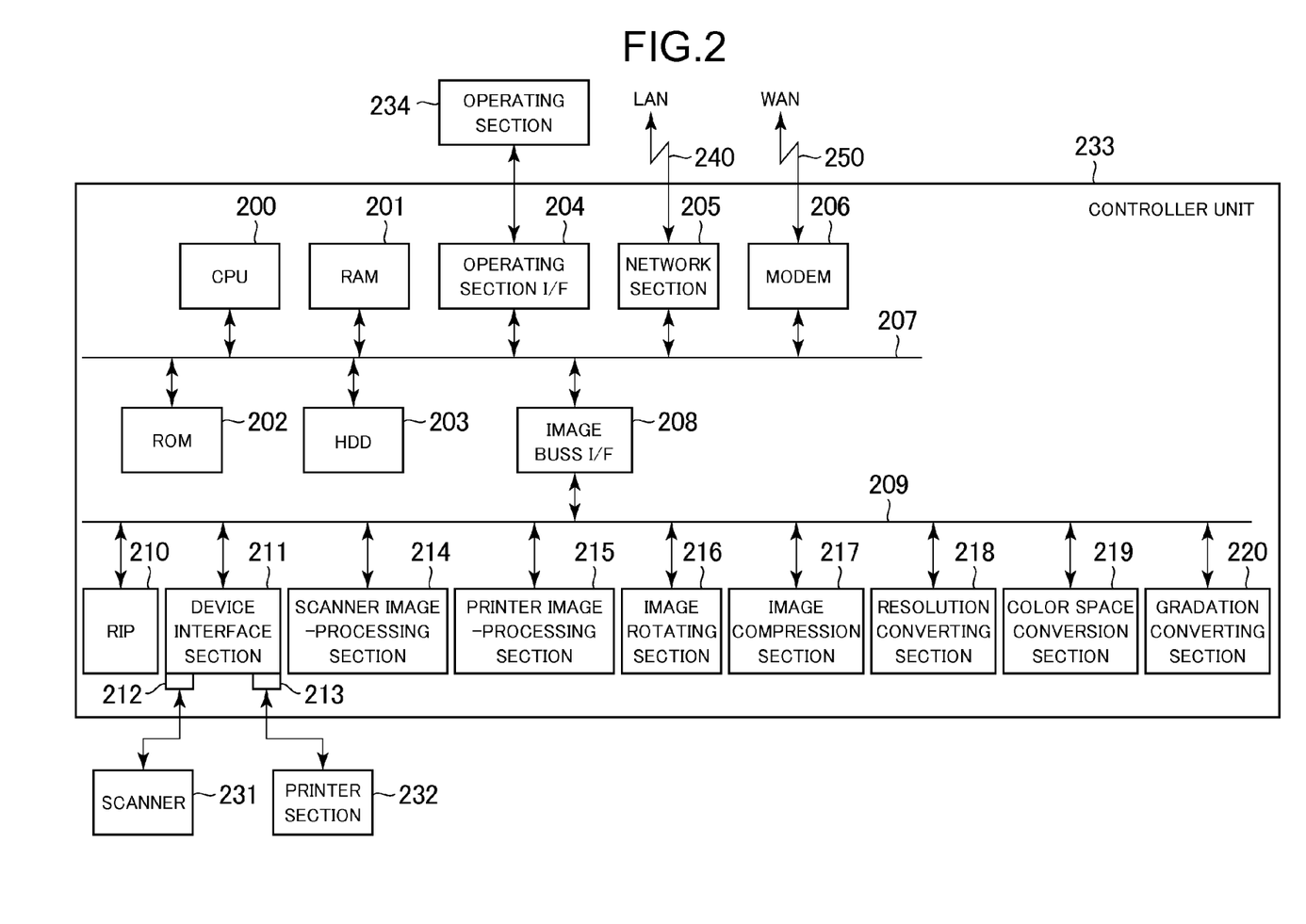
FIG. 2 is a block diagram of the digital multifunction apparatus appearing in FIG. 1.

FIG. 2 is a block diagram of the digital multifunction apparatus appearing in FIG. 1.

In FIG. 2, a controller unit 233 is connected to a scanner section 231 which is an image input device and a printer section 232 which is an image output device, and also connected to a network (LAN) 240 and a public telephone line (WAN) 250, for inputting and outputting image data and device information.

In the controller unit 233, a CPU 200 is a controller that controls the entire system. A RAM 201 is a system working memory for operation of the CPU 200 and is also an image memory (buffer memory) for temporarily storing input image data.

A ROM 202 is a boot ROM which stores a system boot program. A hard disk drive (HDD) 203 stores (records) system software, job events, image data in the user box, and so forth.

An operating section interface 204 is an interface section to an operating section 234 and outputs screen data to be displayed on the operating section 234 to the operating section 234. The operating section interface 204 has the function of transmitting information input by an operator via the operating section 234 to the CPU 200.

A network section 205 is connected to the network (LAN) 240, for inputting and outputting information. A modem 206 is connected to the public telephone line (WAN) 250, for inputting and outputting image data. The above-mentioned devices are provided on a system bus 207.

An image bus interface 208 is a bus bridge that connects the system bus 207 and an image bus 209 which transfers image data at high speed to each other and carries out conversion of data structures.

The following devices are provided on the image bus 209.

A raster image processor (RIP) 210 expands PDL codes into bitmap images. A device interface section 211 connects the scanner 231 and the printer 232 as image input and output devices to the controller 233 via an image input section interface 212 and a printing section interface 213, respectively, and performs image data conversion.

A scanner image-processing section 214 corrects, processes, and edits input image data. Also, the scanner image-processing section 214 has the function of determining whether input image data is of a color original or a black-and-white original, from a chroma signal (saturation signal) of the input image data, and storing the determination result. A printer image-processing section 215 corrects, processes, and edits output image data.

An image rotating section 216 rotates image data and stores the same in the memory (RAM 201) in cooperation with the scanner image-processing section 214 simultaneously when the image data is read from the scanner section 231. Further, the image rotating section 216 rotates image data stored in the memory and stores the same in the memory, or prints/outputs image data stored in the memory while rotating the same in cooperation with the printer image-processing section 215.

An image compression section 217 carries out expansion and compression processing on multivalued image data by JPEG and binary image data by JBIG, MMR, MR, or MH. A resolution converting section 218 converts the resolution of image data stored in the memory and stores the resultant image data in the memory.

A color space conversion section 219 carries out matrix computation to convert, for example, YUV image data stored in the memory into Lab image data and stores the resultant image data in the memory. A gradation converting section 220 converts, for example, 8-bit and 256-gradation image data stored in the memory into 1-bit and 2-gradation image data using an error diffusion method or the like and stores the resultant image data in the memory.

The image rotating section 216, the image compression section 217, the resolution converting section 218, the color space conversion section 219, and the gradation converting section 220 may carry out processing in cooperation with one another. For example, in the case of carrying out image rotation and resolution conversion of image data stored in the memory, it is possible to carry out these two kinds of processing without via the memory.

Figure 3:
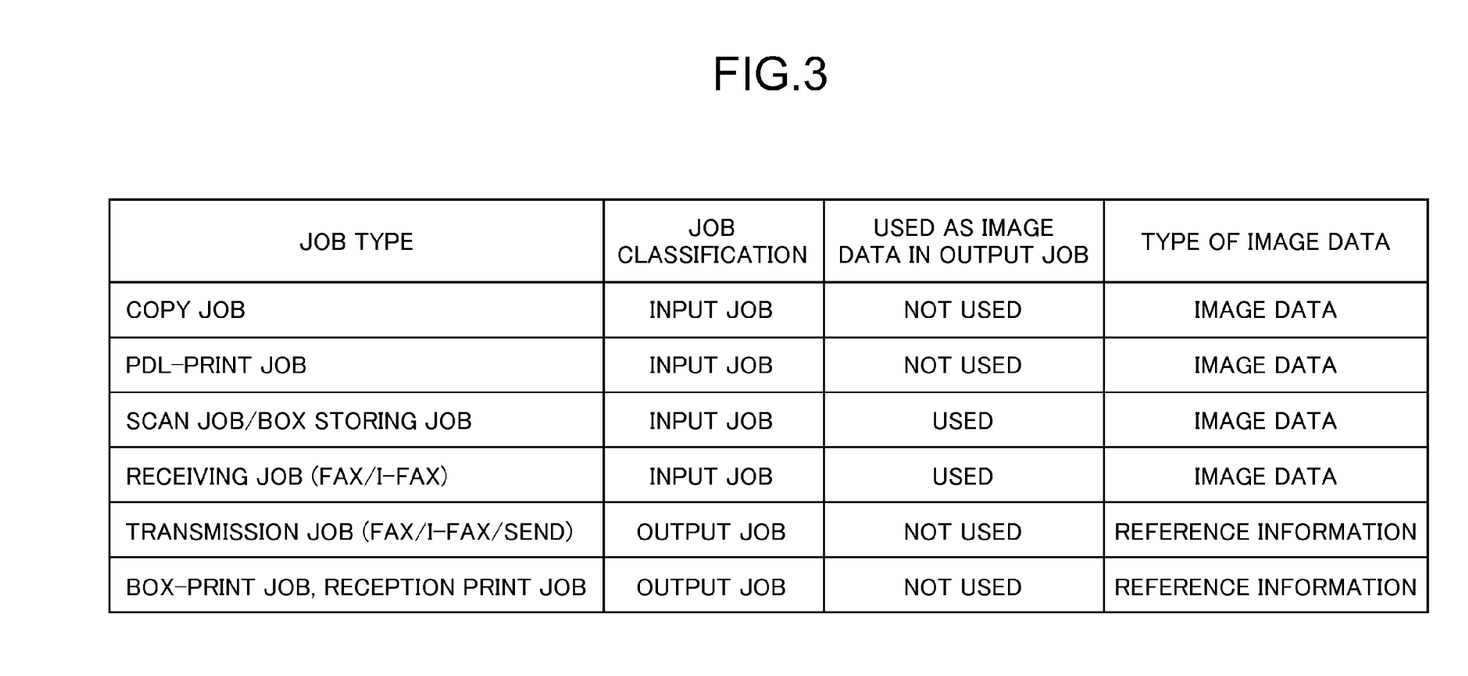
FIG. 3 is a table showing a classification of jobs executed by the digital multifunction apparatus appearing in FIG. 2 and criteria by which to determine whether image data is to be stored.

FIG. 3 is a table showing a classification of jobs executed by the digital multifunction apparatus appearing in FIG. 2 and criteria by which to determine whether image data is to be stored.

More specifically, the table shows a classification of input jobs and output jobs, whether or not image data is reused when a job is an input job, and a type of information on image data included in each job event when the job event is recorded.

The input job is a job in which an image is input when executing the job. For example, a copy job is an input job in which an original read by the scanner 231 is input as an input image. As to input jobs, input image data is recorded in each job event.

The input jobs are classified into a type of jobs in which generated image data is temporarily stored in an area, such as a user box, of the HDD 203 of the digital multifunction apparatus 101, and then output, and other types of jobs than the above-mentioned type. The item of "used as image data in output job" in FIG. 3 indicates that a job is of the above-mentioned type. Although in the copy job, image data obtained by scanning an original is temporarily stored in the HDD 203, after the image data is read from the HDD 203 so as to be printed out, the image data is deleted and not used in any other jobs. On the other hand, in a box storing job, after data obtained by scanning the original is stored in the HDD 203, the data can be used in another job, such as facsimile transmission or printing out. For jobs using input image data which is reused in other jobs, it is necessary to record each job event so as to track output job events even if it is a job type which does not satisfy job event-recording conditions.

The output job is a job which outputs image data which is input in advance. For example, in a box-print job, image data stored in the user box area in the HDD 203 by a box storing job in advance is output. For output jobs, information related to the output job is recorded as job attributes of each job event. On the other hand, as to image data used in the output job, reference information on the image data recorded in a job event in which the image data was input is recorded in the present job event. Since image data used in each output job is not recorded in a job event thereof, it is possible to reduce data size of the job event.

Each output job event is recorded in the database 103 in association with an input job event. That is, when the image processing server 102 receives an output job event from the digital multifunction apparatus 101, the image processing server 102 successively receives an input job event associated with the output job event, and records the input job and the output job in the database 103.

The job events recorded in the database 103 includes document IDs which are identifiers for specifying job events or image data items in the job events. When an image data item generated by an input job is output, the job event of the input job and the job event of the output job have the same document ID.

Figure 4A:
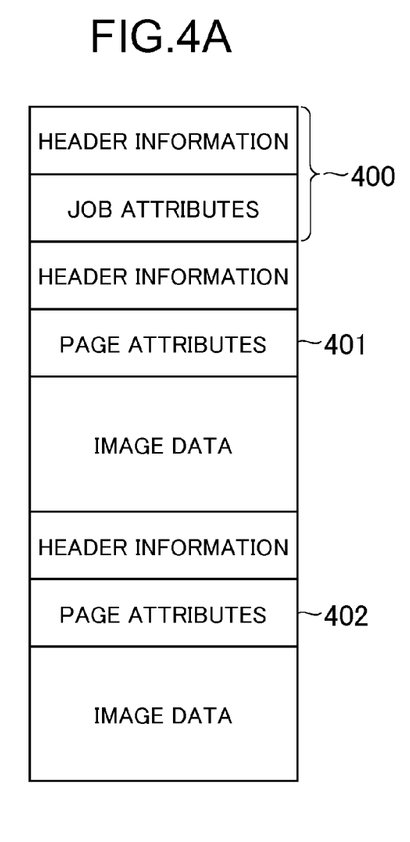
FIGS. 4A, 4B and 4C are diagrams of examples of data formats of job events stored in the digital multifunction apparatus.
Figure 4B:
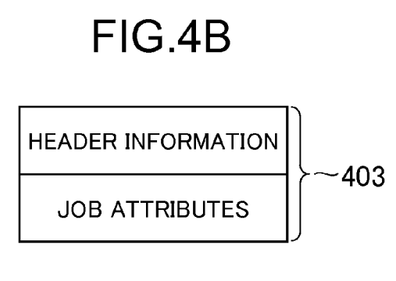
Figure 4C:
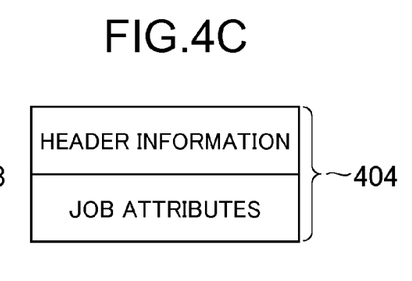

FIGS. 4A, 4B and 4C are diagrams of examples of data formats of job events stored in the digital multifunction apparatus appearing in FIG. 2.

In the illustrated example, as a job event of an input job, a job attribute 400 and image data items 401 and 402 on respective pages are consecutively recorded as shown in FIG. 4A, and as job events of output jobs, job attributes 403 and 404 are recorded as shown in FIGS. 4B and 4C.

Header information comprised of a format version and a data size is added to the job attributes and page attributes, for recording. Image data represents the contents of a job. Although image data having an image format is often recorded, text data or binary data of a non-image format may be recorded. An image data form, and an image size and a resolution in the case of the image format, etc. are recorded in page attributes associated with the image data.

Figure 5:
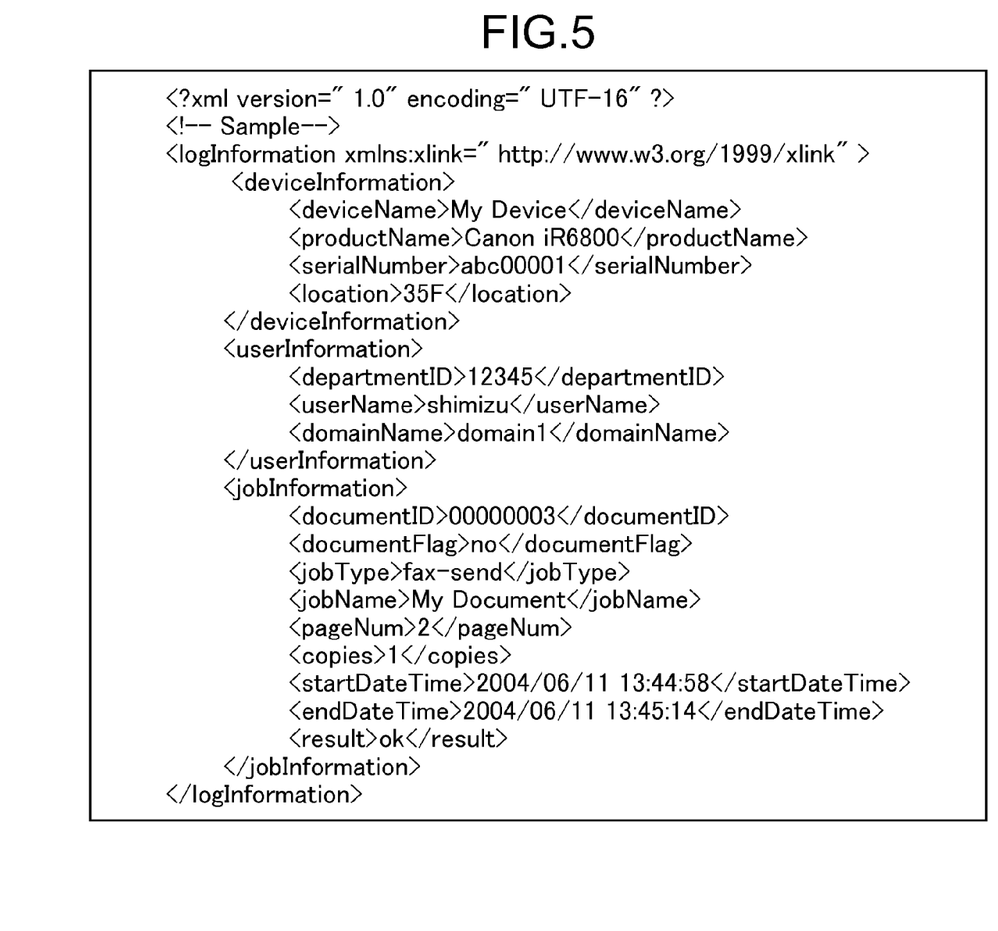
FIG. 5 is a diagram of an example of job attributes stored in the digital multifunction apparatus.

FIG. 5 is a diagram showing an example of job attributes stored in the digital multifunction apparatus appearing in FIG. 2.

Here, the job attributes are recorded in XML format. In the illustrated example, a logInformation element at a root which represents job attributes includes elements mentioned below.

That is, the logInformation element includes a deviceInformation element representing device information, such as a device name and a serial number, and a userInformation element representing user information, such as a department ID and a user name. Further, it also includes a jobInformation element representing job information such as a job type, a job name, and a date and time at the start of the job.

Here, a document ID element represents a document ID, and is a unique value indicating image data input by an input job. Further, a documentFlag element represents an image data flag, and if image data is included, yes is recorded, whereas if no image data is included, no is recorded. In the job attributes of an output job, the image data flag is no, and in this case, the document ID represents reference information indicating image data of an input job other than the output job.

Figure 6:
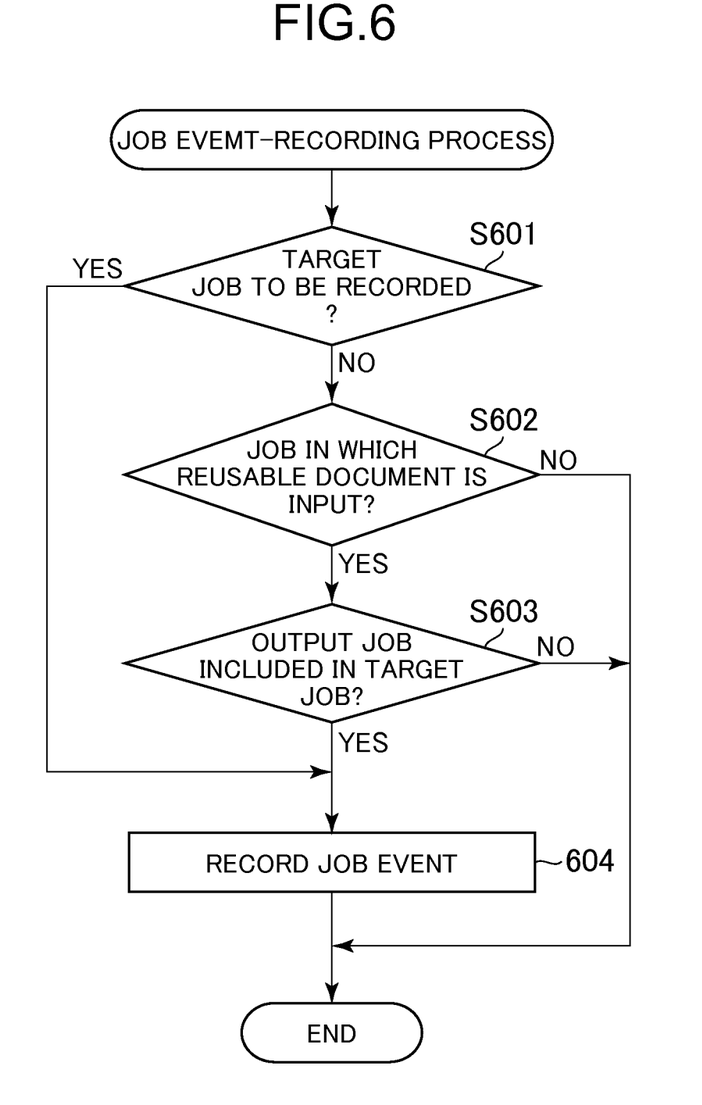
FIG. 6 is a flowchart of a job event-recording process executed along with execution of a job by the digital multifunction apparatus.

FIG. 6 is a flowchart of a job event-recording process executed along with a job execution in the digital multifunction apparatus appearing in FIG. 2.

The present job event-recording process is carried out under the control of the CPU 200 of the digital multifunction apparatus 101.

Before carrying out the present job event-recording process, the digital multifunction apparatus 101 accepts an instruction for executing the job, and then executes the job, and at the same time, the digital multifunction apparatus 101 executes the job event-recording process in FIG. 6. In a step S601, it is determined whether or not the job to be executed is a job to be recorded as a job event. If it is a job to be recorded as a job event, the process proceeds to a step S604. If it is not a job to be recorded as a job event, the process proceeds to a step S602.

The conditions for determining a job as a target job to be recorded as a job event is set in the digital multifunction apparatus 101 in advance by user's input or communication from the server, and are stored (recorded) in the HDD 203 or the like. The CPU 200 determines whether or not the job to be executed is a target job to be recorded as a job event by referring to the settings of the conditions.

It should be noted that the conditions for determining a job as a target job may be set to a job type, which is defined e.g. as a "facsimile transmission job", or to job attributes, such as a destination of a job, which is defined e.g. as an "e-mail transmission job to other companies than one's (outside the domain of one's company). Further, the execution time of a job may be designated as a condition, which is defined e.g. as "job executed after 22:00 before 8:00". If the job about to be executed is a target job, the process proceeds to the step S604, whereas if not, the process proceeds to the step S602.

In the step S602, it is determined whether or not the job about to be executed is an input job which generates reusable image data. If the reusable image data is generated, the generated image data can be reused and output later, and hence the process proceeds to a step S603. If the job is not an input job which generates reusable image data, the job event-recording process for the job is terminated.

In the step S603, it is determined whether or not the output job is included in the jobs designated in advance as target jobs. If the output job is included in the designated target jobs, it is necessary to record the job event of the reusable job, and hence the process proceeds to the step S604, whereas if not, the job event-recording process for the job is terminated.

Now, a description will be given of examples of the above-described job event recording process. Let it be assumed that a box-print job and a copy job are designated as target jobs. In this case, if a box storing job is executed, it is determined in the step S601 that the box storing job is not a target job, and hence the process proceeds to the step S602.

It is determined in the step S602 that the box storing job is an output job in the job classification, which inputs a reusable document, and hence the process proceeds to the step S603.

In the step S603, the job classification of the box-print job and the copy job which are the target jobs is checked. The box-print job is classified as the output job, and the copy job as the input job. Since the target jobs include the output job, the answer to the question of the step S603 is YES, and hence the process proceeds to the step S604.

In the step S604, a job event is recorded in the HDD 203. Recorded information is different depending on the job type. In accordance with the types of image data shown in FIG. 3, image data is recorded together with job attributes for each input job.

At this time, a unique document ID is assigned, and is caused to be included in the job attributes, for recording. As for an output job, only job attributes are recorded. The job attributes of the output job includes the document ID of a reference destination (document to be referred to) as the reference information on the output image data. The input job and the output job are associated with each other by the document ID.

In the present embodiment, the step S604 corresponds to a job event-recording unit in the present invention which is adapted to record a job event. If a job is an output job, the job event-recording unit records a job event in association with a job event of an input job in which the output image data was inputted.

Figure 7:
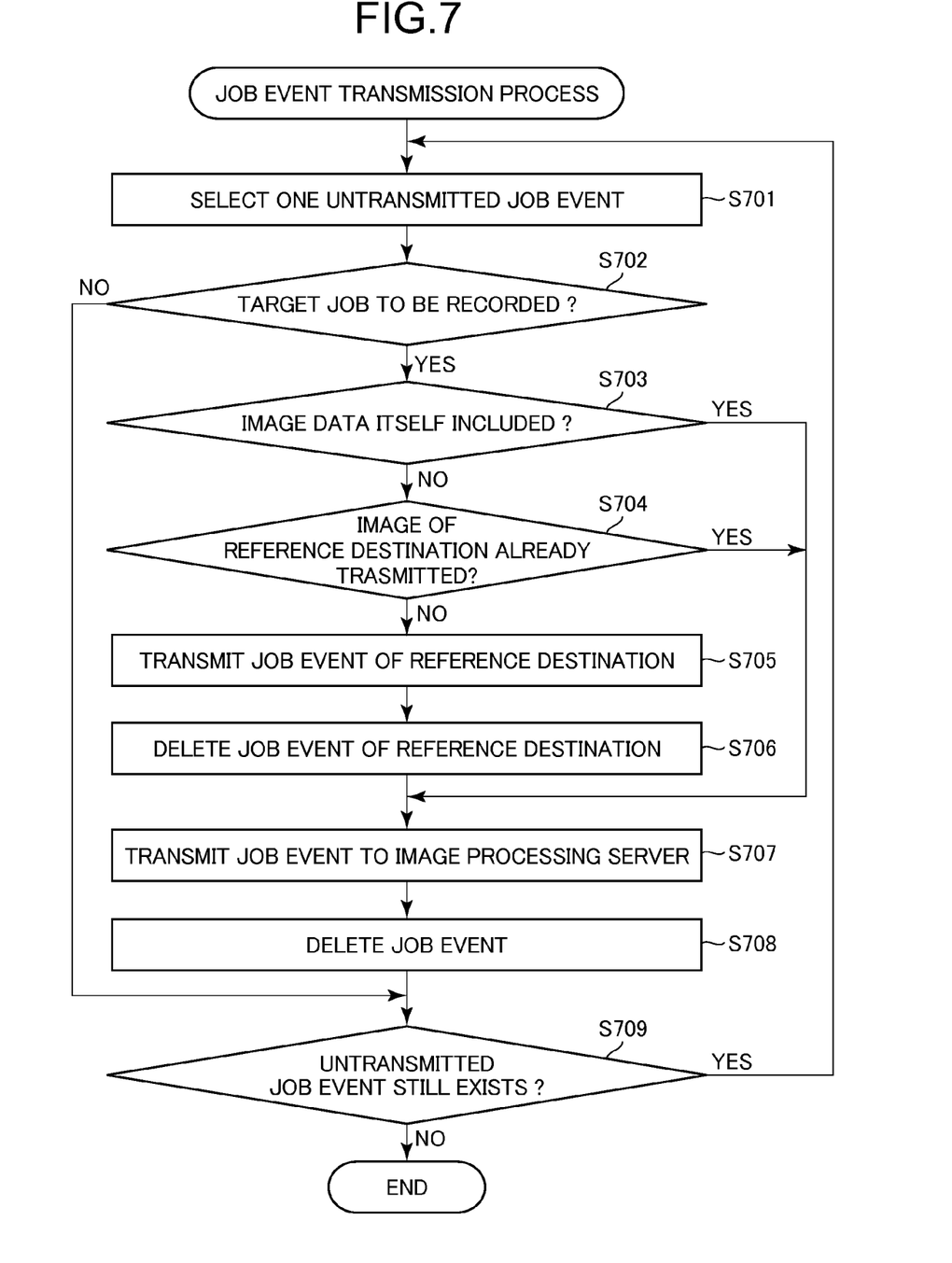
FIG. 7 is a flowchart of a job event transmission process executed by the digital multifunction apparatus, for transmitting recorded job events to an image-processing server.

FIG. 7 is a flowchart of a job event transmission process executed by the digital multifunction apparatus appearing in FIG. 2, for transmitting recorded job events to the image processing server.

The present job event transmission process is carried out under the control of the CPU 200 of the digital multifunction apparatus 101.

The job event transmission process is started at a time preset by the management server 104. Alternatively, the job event transmission process may be carried out by operating the operating section 234 by the user or the administrator of the job event-recording system.

In a step S701 in FIG. 7, one job event is selected from the job events recorded in the digital multifunction apparatus 101. The job events recorded in the digital multifunction apparatus 101 are ordered according to some kind of information. In the present embodiment, the job events are ordered in an executed sequence of the jobs, and whenever the step S701 is carried out, one of job events is sequentially selected, starting with one executed at the oldest date and time.

In a step S702, it is determined whether or not the job event is a target job. If it is a target job, the process proceeds to a step S703. If it is not a target job, the job event is recorded to allow for later reuse, but it is not necessary to singly transmit the job event to the image processing server 102. The process proceeds to a step S709 for selection of a next job event.

In the step S703, a type of information on image data recorded in the job event is determined. If the job event includes image data itself, the process proceeds to a step S707, wherein the image data and the job attributes are transmitted to the image processing server 102. If the job event does not include image data, i.e. if the job event includes reference information on the image data, the process proceeds to a step S704.

In the step S707, the job event selected in the step S701 is transmitted to the image processing server 102. At this time, if the image data is included in the job event selected in the step S701, the image data and the job attributes are transmitted. If the image data is not included in the job event selected in the step S701, only the job attributes are transmitted.

In the present embodiment, the step S707 corresponds to a job event transmission unit in the present invention which is adapted to transmit a job event to the server and delete the same. If the job event is of an output job, the job event transmission unit also transmits the job event of an input job in which output image data was input to the server.

In the present embodiment, the HDD 203 corresponds to a job condition-recording unit in the present invention which is adapted to record job event-recording conditions for determining target jobs to be recorded as job events.

The job event-recording unit records a job event on condition that the job satisfies the job event-recording conditions recorded in the job event-recording unit, or that the job is an input job which generates image data usable by an output job, whereas if not, recording of the job event is stopped.

The job event transmission unit alternatively transmits only job events concerning jobs which satisfy the job event-recording conditions recorded in the job condition-recording unit, to the server.

In a step S708, the job event which is selected in the step S701 is deleted from the HDD 203 of the digital multifunction apparatus 101.

In the step S709, it is determined whether or not there is a job event which has not been transmitted, and has not been selected in the step S701. If there is such a job event, the process returns to the step S701 to repeat the above-described processing. If there is no such a job event, the present job event transmission process is terminated.

The steps S704 to S706 are a process for transmitting a relevant or associated input job event to the image processing server 102, when the job event to be transmitted does not include actual image data, i.e. the job event is of an output job.

In the step S704, it is determined whether or not the image data which is indicated by the reference information for the job selected in the step S701 has already been transmitted to the image processing server 102.

The digital multifunction apparatus 101 according to the present embodiment deletes the job event including the image data which has been transmitted to the image processing server 102 (step S708). Therefore, the determination in the step S704 is equivalent to a process for determining whether or not the image data which has not been transmitted and is indicated by the reference information in the job event selected in the step S701 is included in any job event which has not been transmitted. If the image data of the reference destination has not been transmitted yet, the process proceeds to the step S705. If the image data has already been transmitted, the process proceeds to the step S707.

In the step S705, the job event of the reference destination is transmitted to the image processing server 102.

In the step S706, the job event of the reference destination is deleted from the HDD 203 of the digital multifunction apparatus 101. Then, the process proceeds to the step S707.

Only in the case where a job event of an input job associated with a job event of an output job selected in the step S701 has not been transmitted yet, the job event of the input job associated with the job event of the output job selected in the step S701 is transmitted. This makes it possible to prevent the same input job from being repeatedly transmitted, reduce load on the network, and complete the transmission process of the job event in a short time.

According to the job event-recording process in FIG. 6 and the job event transmission process in FIG. 7, all job events related to the input jobs are not transmitted to the image processing server 102 (or the database 103). When an output job using the image data generated by the input job is executed, the job event of the input job is transmitted to the image processing server 102 (or the database 103). This makes it possible to prevent unnecessary job event from being transmitted, thereby making it possible to reduce the load on the network. Further, it is possible to reduce the load on the image processing server 102, and suppress an increase in the storage capacity of the database 103.

Next, a description will be given of an input job event-deleting process executed in accordance with deletion of reusable image data.

Even if a job is not designated as a target job to be recorded, if it is of a job type in which input image data is reusable, as shown in FIG. 3, the digital multifunction apparatus 101 according to the present embodiment records the job event of the job.

However, if the image data is deleted from the user box formed in the HDD 203 of the digital multifunction apparatus 101, the image data is not output thereafter. Therefore, if the job is not designated as a target job, the input job event of the image data can be deleted.

To realize this, when the image data recorded in the user box or the like is deleted, the document ID of the image data is added to a deleted image data list. The deleting process of job events associated with document IDs included in the deleted image data list is periodically carried out.

Figure 8:
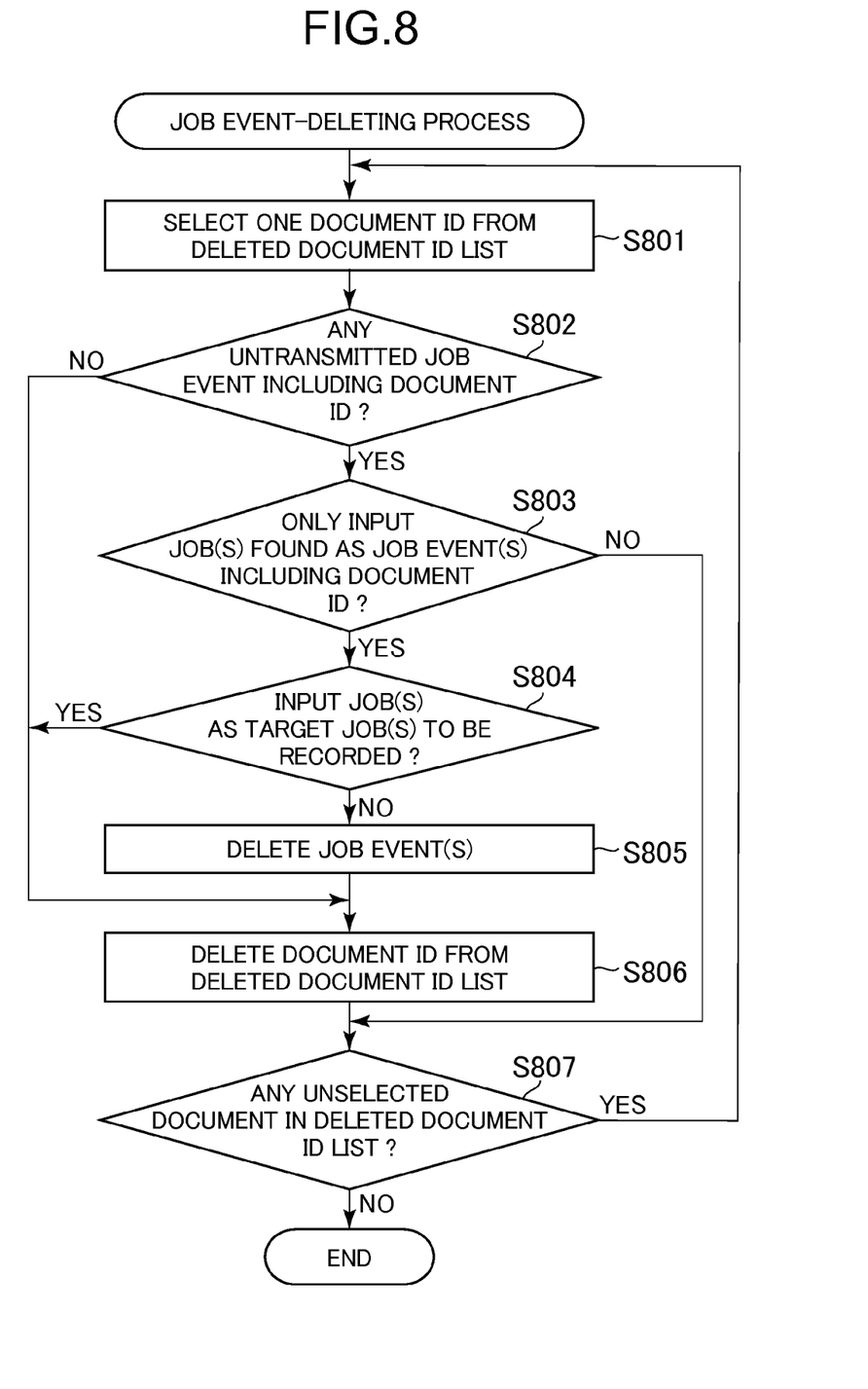
FIG. 8 is a flowchart of a job event-deleting process executed by the digital multifunction apparatus.

FIG. 8 is a flowchart of a job event-deleting process executed by the digital multifunction apparatus appearing in FIG. 2.

The present job event-deleting process is carried out under the control of the CPU 200 of the digital multifunction apparatus 101.

Although in the present embodiment, this process is carried out immediately after the job event transmission process shown in FIG. 7, this is not limitative. For example, the job event-deleting process may be carried out whenever the image data is deleted from the user box.

If the image data stored in the apparatus e.g. in the user box thereof is deleted, the digital multifunction apparatus 101 records IDs of the deleted documents. In a step S801, one document ID is selected from the deleted document ID list.

It should be noted that the document IDs in the deleted document ID list are ordered according to some kind of information. In the present embodiment, the deleted document IDs are ordered in a deletion sequence, and whenever the step S801 is carried out, one of document IDs is sequentially selected, starting with one deleted at the oldest date and time.

In a step S802, it is determined whether or not there is any job event including the document ID among the job events not having been transmitted. If there is one or more job events including the document ID, the process proceeds to a step S803, whereas if not, the job event(s) including image data having the document ID has/have been transmitted to the image processing server 102, and hence the job event(s) has/have been deleted from the HDD 203. This means that it is not necessary to carry out the transmission process or the deleting process on the job event(s), and the process proceeds to a step S806.

In the step S803, it is determined whether or not the job event(s) not having been transmitted which is/are found in the step S802 is/are only input jobs. If a job event includes image data, the job event is an input job. If a job event does not include image data, but includes a document ID as reference information, the job event is an output job.

If the job event(s) not having been transmitted which is/are found in the step S802 is/are only input job(s), the process proceeds to a step S804. If the job event(s) not having been transmitted which is/are found in the step S802 include(s) at least one output job, the process proceeds to a step S807.

This means that in transmitting an output job event not having been transmitted, to the image processing server 102, an input job event associated with the output job event is also transmitted to the image processing server 102, and hence the input job event is not deleted.

In the step S804, it is determined whether or not the input job(s) are target job(s) to be recorded. If the input job(s) is/are target job(s), the process proceeds to the step S806 without deleting the job event(s). If the input job(s) is/are not target job(s), the process proceeds to a step S805.

In the step S805, the input job event(s) in which the document ID is input is/are deleted. Since the image data input by the input job(s) has been deleted, and is not output by the output job thereafter, the input job event(s) can be deleted.

In the present embodiment, the step S805 corresponds to a job event-deleting unit in the present invention. In a case where image data recorded in the digital multifunction apparatus 101 by the input job is deleted, the job event of an output job, if any, which is associated with the input job of the image data, has already been recorded. Therefore, it is determined whether or not the job event of the output job has not been transmitted to the server. If this condition is satisfied, the job event-deleting unit deletes the job event of the input job in which the image data is input.

In the step S806, the document ID is deleted from the deleted document ID list.

In the step S807, it is determined whether or not any document ID not having been selected in the step S801 remains in the deleted document ID list. If such a document ID exists, the process returns to the step S801 to repeat the steps described above. If such a document ID does not exist, the input job event-deleting process is terminated.

By carrying out the job event-deleting process, it is possible to properly delete the job event of the input job which is no longer referred to, to thereby suppress the use of storage space of the HDD 203 of the digital multifunction apparatus 101.

Figure 9:
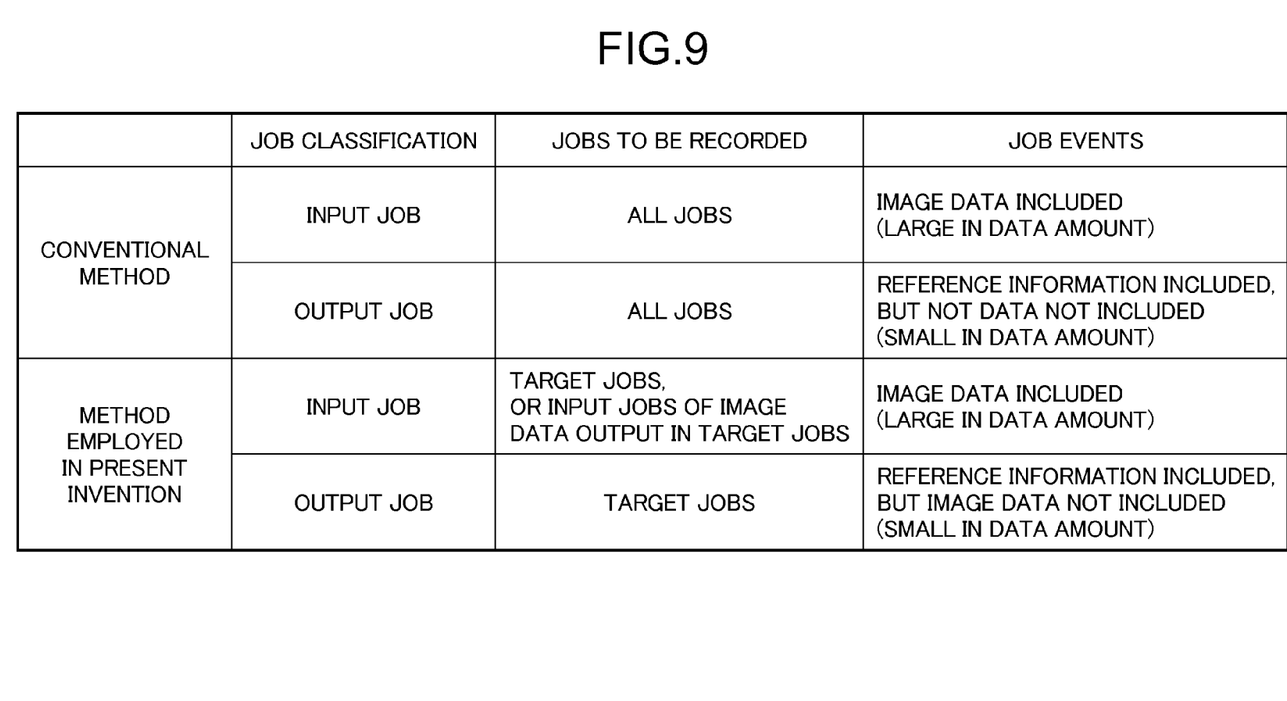
FIG. 9 is a table showing target jobs to be recorded and amounts of stored data for comparison between the conventional method and the method employed by the digital multifunction apparatus.

FIG. 9 is a table showing target jobs to be recorded and amounts of stored data for comparison between the conventional method and the method employed by the digital multifunction apparatus as the image input-output apparatus according to the present embodiment.

More specifically, FIG. 9 shows target jobs to be recorded by the conventional method disclosed in Japanese Laid-Open Patent Publication No. 2006-330939 and the method employed by the digital multifunction apparatus 101 in FIG. 2, and amounts of data which are caused to flow over the network and be recorded as respective job events in the database 103 by the two methods.

Differently from the conventional method, in the above-described embodiment, target jobs designated by the auditor, and only input jobs having input images which are output in the target jobs are transferred over the network and are recorded in the image processing server 102 and the database 103. This makes it possible to suppress load on the network, the image processing server 102, and the database 103.

Figure 10:
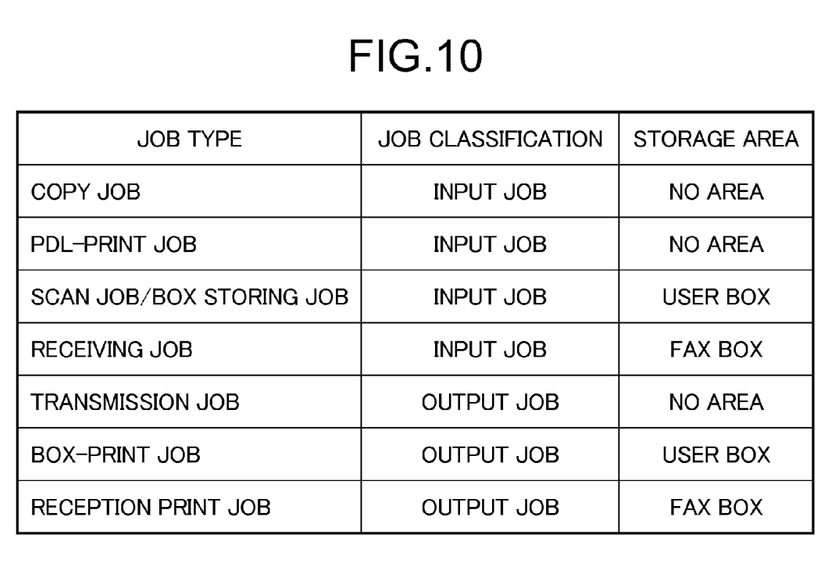
FIG. 10 is a table showing an example of the relationship between input jobs and output jobs performed by the digital multifunction apparatus and storage areas provided therein.

FIG. 10 is a table showing an example of the relationship between the input jobs and the output jobs performed by the digital multifunction apparatus in FIG. 2 and storage areas provided therein.

A description will be given of a case where the digital multifunction apparatus 101 has a plurality of areas to store image data therein, and different types of output jobs are stored in respective different areas.

For job types having "no area" entered in boxes associated therewith for indicating a storage area, input image data is not reusable in the other jobs.

That is, the present digital multifunction apparatus 101 includes areas called user box and FAX box for temporarily storing image data items. Each image data item generated by a scan job or a box storing job is stored in the user box, and is output by a box-print job. Each image data item generated by a FAX receiving job is stored in the FAX box, and is output by a reception print job.

To track job events on the digital multifunction apparatus 101 by setting the box print job as targets to be monitored, it is necessary to record the job events as follows. That is, it is necessary to record the job events of the box print job, and the input jobs (the scan job and the box storing job in the illustrate example of FIG. 10) for input to the user box which the box print job refers to.

In this case, the step S603 in the job event-recording process is replaced by the following processing: By referring to the storage areas of the respective output jobs included in the target jobs, and a set of input jobs associated with the storage areas is obtained. Then, it is determined whether or not the job about to be executed is included in the set, and if the job is included in the set, the process proceeds to the step S604, whereas if not, the job event-recording process is terminated.

In this case, the step S603 corresponds to a relation/no relation-determining unit in the present invention, which is adapted to determine whether or not an image generated by a predetermined input job has a possibility of being output in a predetermined output job.

The job event-recording unit records a job event of a job which satisfies the job event-recording conditions recorded in the job condition-recording unit. Further, the job event-recording unit records a job event of an input job which is determined by the relation/no relation-determining unit that an image generated by the input job has a possibility of being output in an output job satisfying the job event-recording conditions.

According to the present embodiment, it is possible to suppress the use of storage space of the HDD 203 of the digital multifunction apparatus by preventing recording of job events of input jobs which are not referred to by any output jobs as targets to be recorded job events. Further, the job event-recording process is not performed on the above-mentioned input jobs, whereby it is possible to reduce load due to execution of the input jobs.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2008-067878 filed Mar. 17, 2008, which is hereby incorporated by reference herein in its entirety.

What is claimed is:

1. An image input-output apparatus comprising:
a job execution unit adapted to execute input jobs concerning input of an image, and output jobs concerning output of an image;
a job event-recording unit adapted to record job events for input jobs and output jobs executed by the job execution unit, the job events for input jobs storing job attributes for the respective input jobs and image data included in the respective input jobs, and the job events for the output jobs storing job attributes for image data and a reference to the image data, instead of the image data itself, used by the respective output jobs;
a job event transmission unit adapted to transmit the job events to a server; and
a determination unit adapted to determine whether a job executed by the job execution unit is an input job or an output job, and, in a case that it is determined by the determination unit that the job executed by the job execution unit is the input job, whether or not image data input by the corresponding input job executed by the job execution unit is used in another job,
wherein, if it is determined by the determination unit that the job executed by the job execution unit is the output job, the job event-recording unit is adapted to record a job event of the output job in association with a job event of an input job in which image data used in the output job is input, and the job event transmission unit is adapted to transmit the job event of the input job associated with the job event of the output job to the server together with the job event of the output job, and
wherein, if it is determined by the determination unit that the job executed by the job execution unit is the input job, and if it is determined by the determination unit that the image data input by the corresponding input job is not used in another job, the job event-recording unit is adapted to not record a job event for the corresponding input job, and, consequently, the job-event-recording unit is adapted to not record the image data input by the corresponding input job or attributes for the corresponding input job, and the job event transmission unit is adapted to not transmit a job event for the corresponding input job to the server.

2. The image input-output apparatus according to claim 1, wherein if the job executed by the job execution unit is the output job, the job event transmission unit is adapted to determine whether or not a job event of an input job associated with the output job has been transmitted to the server, and if the job event of the input job associated with the output job has been transmitted to the server, then the job event transmission unit is adapted to transmit only the job event of the output job to the server.

3. The image input-output apparatus according to claim 1, further comprising a job event-deleting unit adapted to delete ones of job events recorded by the job event-recording unit, the ones having been transmitted by the job event transmission unit.

4. The image input-output apparatus according to claim 3, wherein, if image data recorded in the image input-output apparatus by an input job is deleted, and at the same time the job execution unit has not executed an output job using the image data, the job event-deleting unit is adapted to delete the job event of the input job, whereas, if image data recorded in the image input-output apparatus by an input job is deleted, if a job event of an output job associated with a job event concerning the input job has been recorded by the job event-recording unit, and at the same time the job event of the output job has not been transmitted by the job event transmission unit, the job event-deleting unit is adapted to not delete the job event of the input job.

5. The image input-output apparatus according to claim 1, further comprising a job condition-recording unit adapted to record job event-recording conditions indicating types of jobs which are targets to be recorded as job events,
wherein, if a type of a job executed by the job execution unit satisfies the job event-recording conditions which are recorded in the job condition-recording unit, or the job is an input job which generates image data usable by the output job, the job event-recording unit is adapted to record a job event of the job, whereas if not, the job event-recording unit is adapted to not record the job event of the job, and
wherein the job event transmission unit is adapted to transmit job events of jobs of the types which satisfy the job event-recording conditions recorded in the job event condition recording unit, to the server.

6. The image input-output apparatus according to claim 5, further comprising a relation/no relation-determining unit adapted to determine whether or not image data generated by an input job has a possibility of being output by an output job, wherein, if a job executed by the job execution unit is a job of a type which satisfies the job event-recording conditions recorded in the job condition-recording unit, or is an input job which is determined by the relation/no relation-determining unit to have a possibility of being output by an output job, the job event-recording unit is adapted to record the job event.

7. A job event-recording system comprising:
an image input-output apparatus comprising:
a job execution unit adapted to execute input jobs concerning input of an image, and output jobs concerning output of an image;
a job event-recording unit adapted to record job events for input jobs and output jobs executed by the job execution unit, the job events for input jobs storing job attributes for the respective input jobs and image data included in the respective input jobs, and the job events for the output jobs storing job attributes for image data and a reference to the image data, instead of the image data itself, used by the respective output jobs;
a job event transmission unit adapted to transmit the job events; and
a determination unit adapted to determine whether a job executed by the job execution unit is an input job or an output job, and, in a case that it is determined by the determination unit that the job executed by the job execution unit is the input job, whether or not image data input by the corresponding input job executed by the job execution unit is used in another job,
wherein, if it is determined by the determination unit that the job executed by the job execution unit is the output job, the job event-recording unit is adapted to record a job event of the output job in association with a job event of an input job in which image data used in the output job is input, and the job event transmission unit is adapted to transmit the job event of the input job associated with the job event of the output job together with the job event of the output job, and
wherein, if it is determined by the determination unit that the job executed by the job execution unit is the input job, and if it is determined by the determination unit that the image data input by the corresponding input job is not used in another job, the job event-recording unit is adapted to not record a job event for the corresponding input job, and, consequently, the job-event-recording unit is adapted to not record the image data input by the corresponding input job or attributes for the corresponding input job, and the job event transmission unit is adapted to not transmit a job event for the corresponding input job; and
a server comprising a job event-recording unit adapted to receive and record job events transmitted by the job event transmission unit of the image input-output apparatus,
wherein the job event-recording unit is adapted to record the job event of an output job and the job event of an input job in association with each other.

8. An image input-output method comprising the steps of:
executing input jobs concerning input of an image, and output jobs concerning output of an image;
recording job events for input jobs and output jobs executed in the executing step, the job events for input jobs storing job attributes for the respective input jobs and image data included in the respective input jobs, and the job events for the output jobs storing job attributes for image data and a reference to the image data, instead of the image data itself, used by the respective output jobs;
transmitting the job events to a server; and
determining whether a job executed in the executing step is an input job or an output job, and, in a case that it is determined that the job executed in the executing step is the input job, whether or not image data input by the corresponding input job executed in the executing step is used in another job,
wherein, if it is determined in the determining step that the job executed in the executing step is the output job, the recording step includes recording a job event of the output job in association with a job event of an input job in which image data used in the output job is input, and the transmitting step includes transmitting the job event of the input job associated with the job event of the output job to the server together with the job event of the output job, and
wherein, if it is determined in the determining step that the job executed in the executing step is the input job, and if it is determined in the determining step that the image data input by the corresponding input job is not used in another job, the recording step does not include recording a job event for the corresponding input job, and, consequently, the recording step does not include recording the image data input by the corresponding input job or attributes for the corresponding input job, and the transmitting step does not include transmitting a job event for the corresponding input job to the server.

* * * * *